(12) United States Patent
Fulmer et al.

(10) Patent No.: US 6,321,039 B1
(45) Date of Patent: Nov. 20, 2001

(54) DUAL FILM EXPOSURE, ELECTRONIC EXPOSURE CAMERA WITH MULTIPLE REWRITE ON FILM EXCEPT FOR FINAL EXPOSURE

(75) Inventors: James W. Fulmer, Canandaigua; Robert G. Hills, Spencerport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/491,448

(22) Filed: Jan. 26, 2000

(51) Int. Cl.[7] .............................. G03B 1/00; G03B 17/24
(52) U.S. Cl. ...................... 396/310; 396/319; 396/410; 396/429
(58) Field of Search ........................ 396/319, 310, 396/410, 287, 374, 301, 429

(56) References Cited

U.S. PATENT DOCUMENTS

| | | | |
|---|---|---|---|
| 4,714,962 | 12/1987 | Levine | 348/64 |
| 5,710,954 | 1/1998 | Inoue | 396/374 |
| 5,742,856 | * 4/1998 | Izukawa | 396/319 |

* cited by examiner

*Primary Examiner*—W. B. Perkey
(74) *Attorney, Agent, or Firm*—Roger A. Fields

(57) ABSTRACT

A camera for exposing latent images on successive frames of a filmstrip having magnetic recording capacity, includes a memory that stores a count indicative of the film frames remaining to be exposed (including a count of "0" to indicate that the final frame was exposed), a magnetic head that magnetically records user-selected information on the filmstrip adjacent each film frame, and a motor that is actuated following exposure of each film frame to advance the filmstrip to permit the magnetic head to record the information on the filmstrip adjacent each exposed frame. A plurality of information selection switches can be manually used to select the information the magnetic head will magnetically record on the filmstrip adjacent the most-recently exposed one of the film frames including the final exposed frame. An input receiving control is connected to the memory, the magnetic head, the motor, and the information selection switches to actuate the motor to advance the filmstrip to permit the magnetic head to record the information on the filmstrip adjacent the most recently exposed one of the film frames except the final exposed frame, each time at least one of the selection switches is used to select the information, and to record the information on the filmstrip adjacent the final exposed frame, only one time at least one of the selection switches is used to select the information.

7 Claims, 5 Drawing Sheets

DUAL FILM EXPOSURE, ELECTRONIC EXPOSURE CAMERA WITH MULTIPLE REWRITE ON FILM EXCEPT FOR FINAL EXPOSURE

CROSS REFERENCE TO RELATED APPLICATIONS

Reference is made to commonly assigned copending applications Ser. No. 09/491,633, entitled DUAL FILM EXPOSURE, ELECTRONIC EXPOSURE CAMERA WITH FILM REWRITE FUNCTION and filed Jan. 26, 2000 in the name of James W. Fulmer, and Ser. No. 09/492,055, entitled DUAL FILM EXPOSURE, ELECTRONIC EXPOSURE CAMERA WITH DELAY IN FILM REWIND AFTER FINAL EXPOSURE TO ALLOW FILM REWRITE and filed Jan. 26, 2000 in the name of Robert Hills and James W. Fulmer.

FIELD OF THE INVENTION

The invention relates generally to the field of photography, and in particular to a dual film exposure, electronic exposure camera which substantially simultaneously exposes a latent image of the subject on a conventional filmstrip and focuses a corresponding image on an electronic image sensor such as a CCD or a CMOS.

BACKGROUND OF THE INVENTION

Cameras are available today for exposing latent images on successive frames of a filmstrip having magnetic recording capacity, in which a memory stores a count indicative of the film frames remaining to be exposed including to indicate that the final frame was exposed, a magnetic head magnetically records user-selected information on the filmstrip adjacent each film frame, and a motor is actuated following exposure of each film frame to advance the filmstrip to permit the magnetic head to record the information on the filmstrip adjacent each exposed frame.

The Cross-Referenced Applications

The cross-referenced application Ser. No. 09/491,633, entitled DUAL FILM EXPOSURE, ELECTRONIC EXPOSURE CAMERA WITH FILM REWRITE FUNCTION, discloses a camera for exposing latent images on successive frames of a filmstrip having magnetic recording capacity, including a control that actuates a motor following exposure of each film frame to advance the filmstrip forward one frame increment, and a magnetic head that magnetically records user-selected information on the filmstrip adjacent the most-recently exposed one of the film frames as the filmstrip is advanced forward. The control first actuates the motor to advance the filmstrip rearward one frame increment when it is desired to change the existing information magnetically recorded adjacent the most-recently exposed one of the film frames to some new information, and then actuates the motor to advance the filmstrip forward one frame increment for the magnetic head to magnetically record the new information adjacent the same frame in place of the existing information. Preferably, an electronic image sensor is connected to the control to form an electronic image corresponding to the latent image on the most-recently exposed one of the film frames, and a memory is connected to the control to store the electronic image corresponding to the latent image on the most-recently exposed one of the film frames and to store at least some of the magnetically recorded information for the same frame superimposed on the electronic image.

The cross-referenced application Ser. No. 09/492,055, entitled DUAL FILM EXPOSURE, ELECTRONIC EXPOSURE CAMERA WITH DELAY IN FILM REWIND AFTER FINAL EXPOSURE TO ALLOW FILM REWRITE, discloses a camera for exposing latent images on successive frames of a filmstrip having magnetic recording capacity, includes a memory that stores a count indicative of the film frames remaining to be exposed (including a count of "0" to indicate that the final frame was exposed), a magnetic head that magnetically records user-selected information on the filmstrip adjacent each film and a motor that is actuated following exposure of each film frame to advance the filmstrip forward one frame increment to permit the magnetic head to record the information on the filmstrip adjacent each exposed frame and that is actuated after the magnetic information is written on the filmstrip adjacent the final exposed frame to rewind the exposed film length rearward. An input receiving control is connected to the memory, the magnetic head, and the motor for delaying actuation of the motor to rewind the exposed film length rearward after the magnetic head has magnetically written the information on the filmstrip adjacent the final exposed frame, to give the user some time to manually input to the control that the information magnetically written adjacent the final exposed frame should be rewritten, and in the absence of the input by the time the delay has elapsed triggers actuation of the motor to rewind the exposed film length rearward.

SUMMARY OF THE INVENTION

A camera for exposing latent images on successive frames of a filmstrip having magnetic recording capacity, in which a memory stores a count indicative of the film frames remaining to be exposed including to indicate that the final frame was exposed, a magnetic head magnetically records user-selected information on the filmstrip adjacent each film frame, and a motor is actuated following exposure of each film frame to advance the filmstrip to permit the magnetic head to record the information on the filmstrip adjacent each exposed frame, is characterized in that:

a plurality of information selection switches can be manually used to select the information the magnetic head will magnetically record on the filmstrip adjacent the most-recently exposed one of the film frames including the final exposed frame; and an input receiving control is connected to the memory, the magnetic head, the motor, and the information selection switches to actuate the motor to advance the filmstrip to permit the magnetic head to record the information on the filmstrip adjacent the most-recently exposed one of the film frames except the final exposed frame, each time at least one of the selection switches is used to select the information, and to record the information on the filmstrip adjacent the final exposed frame, only one time at least one of the selection switches is used to select the information.

DETAILED DESCRIPTION OF THE INVENTION

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
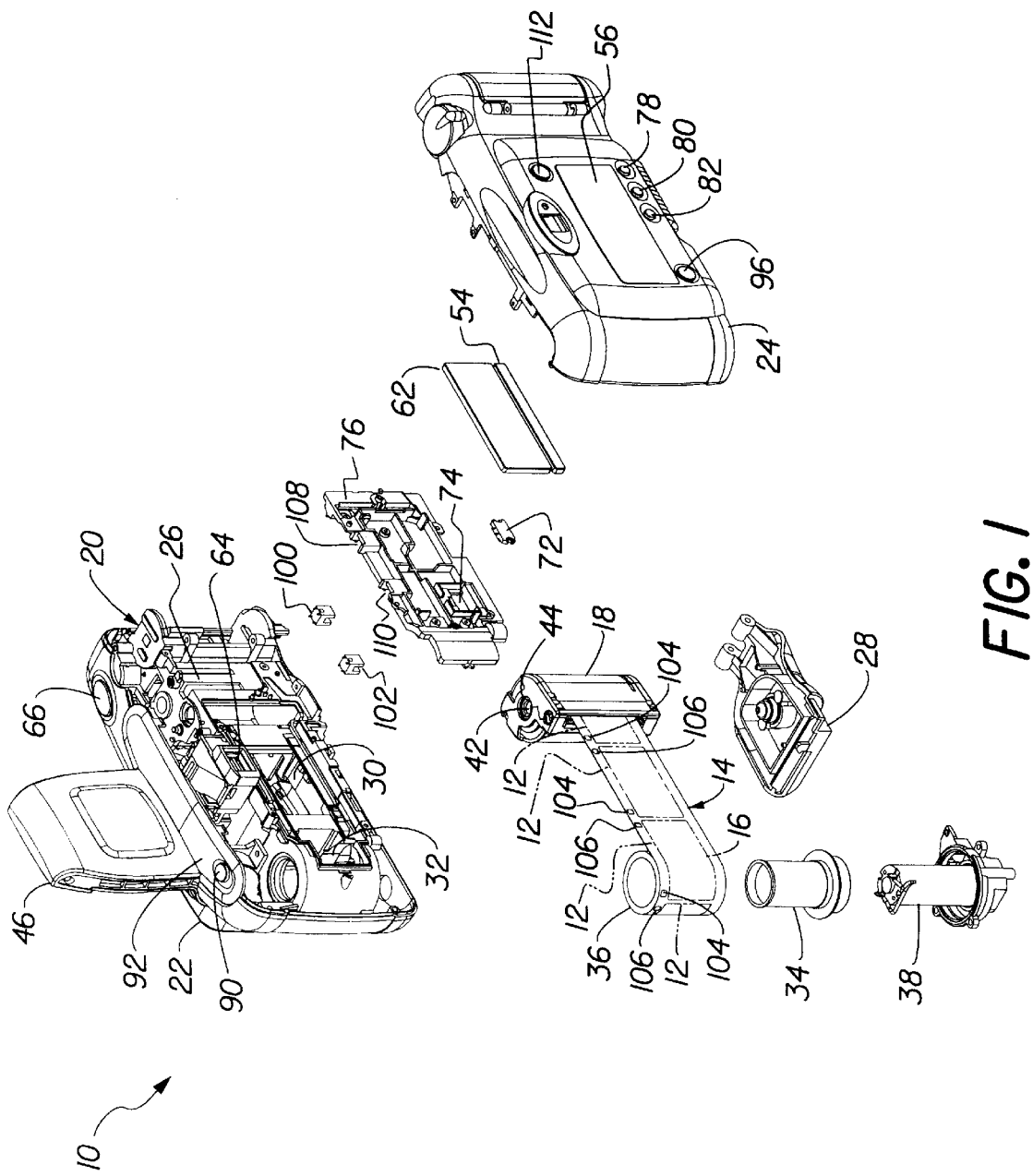
FIG. 1 is a rear exploded perspective view of a camera according to a preferred embodiment of the invention.
Figure 2:
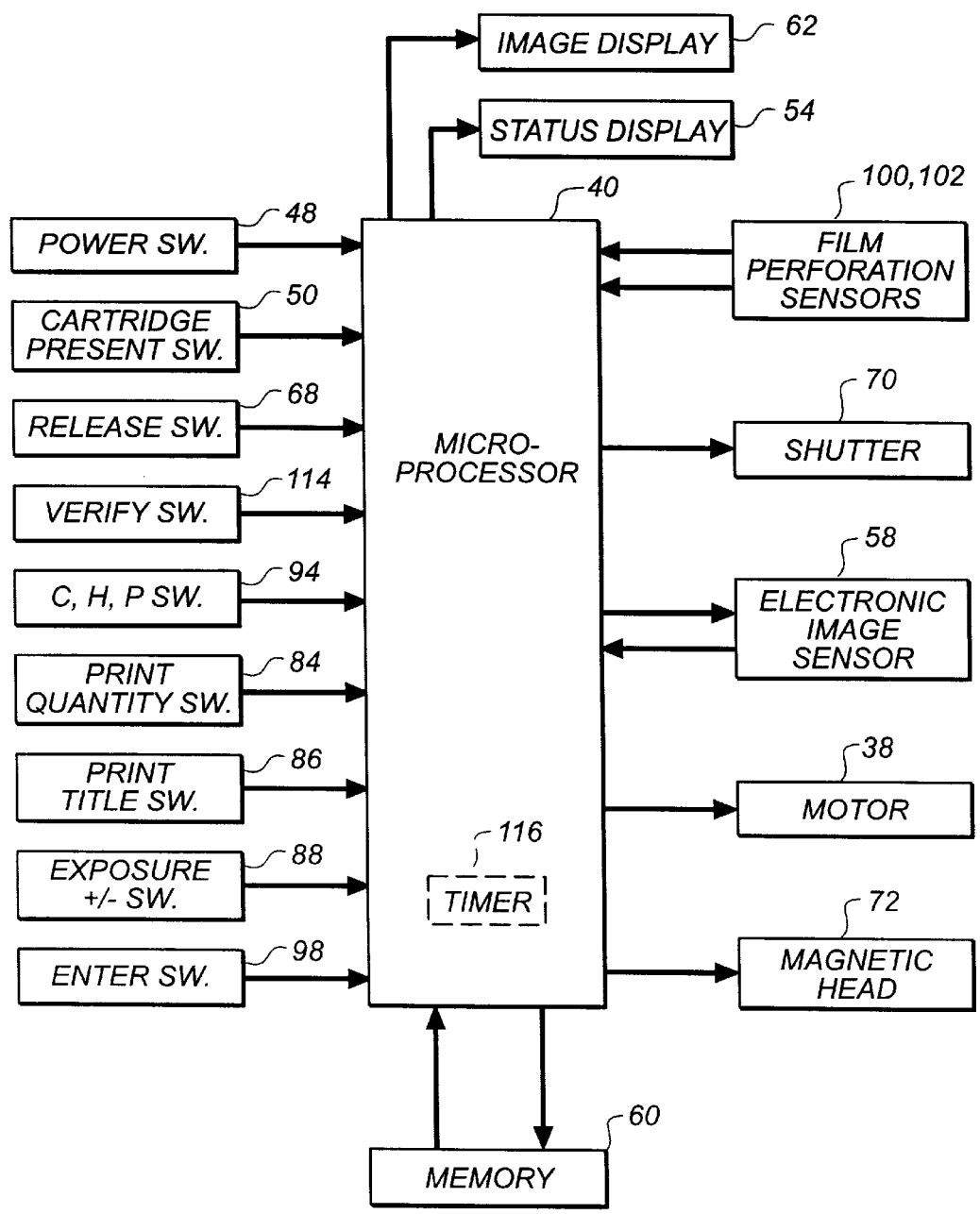
FIG. 2 is a block diagram of various components of the camera.

Referring now to the drawings, FIGS. 1 and 2 show a motorized film advance camera 10 for exposing latent images on successive frames 12 of a known "Advanced Photo System" ("APS") filmstrip 14. The filmstrip 14 has a transparent magnetic overlay which gives it magnetic recording capacity to store various user-selected information along a track 16 adjacent each exposed frame 12, and it is normally housed in an opaque film cartridge 18. Typically, the filmstrip 14 is available in 15-exposure, 25-exposure, and 40-exposure lengths.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open backframe opening 30 at which the respective frames 12 of the filmstrip 14 are temporarily positioned one at a time to be exposed, and an exposed film take-up chamber 32 that contains a film take-up spool 34 which is incrementally rotated following each film exposure to wind the most-recently exposed one of the film frames onto an exposed film roll 36 on the spool (and to position a fresh unexposed frame at the backframe opening 30). When the film take-up spool 34 is incrementally rotated, the filmstrip 14 is advanced forward one frame increment which is slightly greater than a frame width. A drive motor 38 resides inside the film take-up spool 34 for incrementally rotating the spool, and its operation is controlled by a known microcomputer 40. When substantially the entire length of the filmstrip 14 is exposed, i.e. the total number of available frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length into the cartridge. Then, the door 28 is pivoted open to remove the film cartridge 18.

A known electronic flash unit 46 for flash assisted exposures is flipped up from partially covering the front cover part 22 to uncover a taking lens (not shown) preparatory to using the camera 10. See FIG. 1. Flipping up the flash unit 46 closes a normally open power switch 48 connected to the microcomputer 40 to electrically power "on" the camera 10. See FIG. 2.

Figure 3:
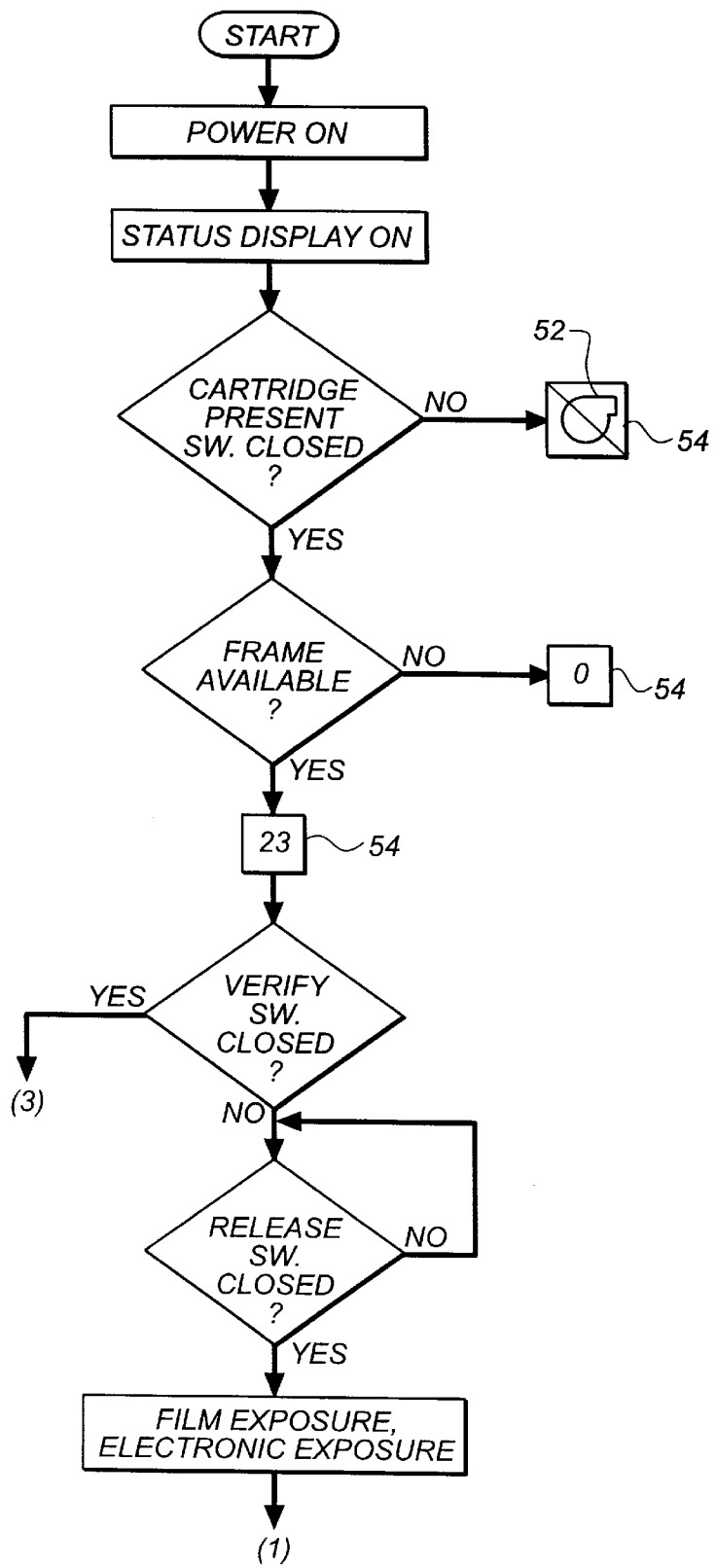
FIGS. 3, 4 and 5 is a flow chart depicting operation of the camera to illustrate the invention.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is provided in a known status display 54 such as an LCD connected to the microcomputer 40. The status display 54 is turned "on" when the power switch 48 is closed, and is located behind a window 56 in the rear cover part 24. See FIG. 1. If the camera 10 is powered "on" and the cartridge present switch 50 is closed, a visible cartridge loaded indication (not shown) is provided in the status display 54.

A known electronic image sensor 58 connected to the microcomputer 40, for example a CCD with integrated shuttering capability or a CMOS with integrated shuttering capability, forms an electronic image that corresponds to the latent image on the most-recently exposed one of the film frames 12. The electronic image is stored in a memory 60 connected to the microcomputer 40 and can be seen in a known image display 62 such as an LCD connected to the microcomputer. The image display 62 is located next to the status display 54, behind the window 56 in the rear cover part 24. Each time an unexposed one of the film frames 12 is exposed, the electronic image is replaced in the memory 60. The memory 60 can store only the latest (most recent) image.

A viewfinder 64 for viewing a subject to be photographed is located on the main body part 20. See FIG. 1.

To take a picture, a shutter release button 66 on the front cover part 22 is manually depressed which in turn closes a normally open release switch 68 connected to the microcomputer 40. See FIGS. 1 and 2. The closed switch 68 triggers momentary opening of a known normally closed shutter 70 to expose a latent image on the film frame 12 at the backframe opening 30, and to excite the electronic image sensor 58 to form the electronic image substantially simultaneously with exposure of the latent image. The taking lens can be used to focus an image of the subject being photographed, for the electronic image sensor 58 as well as for the filmstrip 14, or separate lens an be provided, as indicated in prior art U.S. Pat. No. 5,710,954 issued Jan. 20, 1998.

A magnetic head 72 is mounted within an opening 74 in a film pressure platen 76 for magnetically recording various user-selected information along the track 16 adjacent the most-recently exposed one of the film frames 12, each time the motor 38 is actuated to incrementally rotate the film take-up spool 34 in order to advance the filmstrip 14 forward a frame increment and wind the most-recently exposed frame onto the exposed film roll 36 on the spool. The film pressure platen 76 serves to support each film frame 12 flat for exposure at the backframe opening 30. The user-selected information for each exposed frame 12, as is known, for example is a selected print quantity, a selected (optional) print title, a selected (optional) print exposure correction+/−, and a selected "APS" print format "C" (classic), "H" (HDTV) or "P" (panoramic). A "C" format print is usually 4×6 inches, a wider "H" format print is often 4×7 inches, and a much wider "P" format print is either 4×10 inches or 4×11.5 inches. Individual visible indications of the selected print quantity, print title, and print exposure correction can be seen in the status display 54. A visible indication of the selected "APS" print format "C", "H" or "P" can be seen in the image display 62 (preferably superimposed on the electronic image in the image display). Only the user selected information that is magnetically recorded along the track 16 adjacent the most-recently exposed one of the film frames 12 is stored in the memory 60. Respective print quantity, title and exposure correction buttons 78, 80 and 82 are provided on the rear cover part 24, and when individually manually depressed one or more times close normally open print quantity, title and exposure correction switches 84, 86 and 88 the same number of times. The print quantity, title and exposure correction switches 84, 86 and 88 are connected to the microcomputer 40 in order to change existing print quantity, title and exposure correction information stored in the memory 60 to newly selected information. A format selection button 90 is provided on a top plate 92, and when manually depressed one or more times closes a normally open C, H, P switch 94 the same number of times. The C, H, P switch 94 is connected to the microcomputer 40 in order to change the existing C, H or P selection stored in the memory 60 to a new one. To enter the newly selected information in the memory 60, an enter button 96 on the rear cover part 24 must be manually depressed which in turn closes a normally open enter switch 98 connected to the microcomputer 40.

A pair of identical film perforation sensors 100 and 102 for sensing successive pairs of film perforations 104 and 106 in the filmstrip 14 are mounted in respective pockets 108 and 110 in the film pressure platen 76 and are connected to the microcomputer 40. The two sensors 100 and 102, as is known, are used to decrement a frame count in the memory 60 by "1", each time the filmstrip 14 is advanced forward a frame increment and the most-recently exposed one of the film frames 12 is wound onto the exposed film roll 36 on the film take-up spool 34. The frame count begins with "15", "25" or "40" depending whether the filmstrip 40 has a 15-exposure, 25-exposure, or 40-exposure length.

A verify button 112 is provided on the rear cover part 24 which can be manually depressed to in turn close a normally open verify switch 114 connected to the microcomputer 40. The closed switch 114 causes the user-selected information stored in the memory 60 and magnetically recorded along the track 16 adjacent the most-recently exposed one of the film frames 12 to be shown in the status display 54 and the image display 62.

Operation

Figure 4:
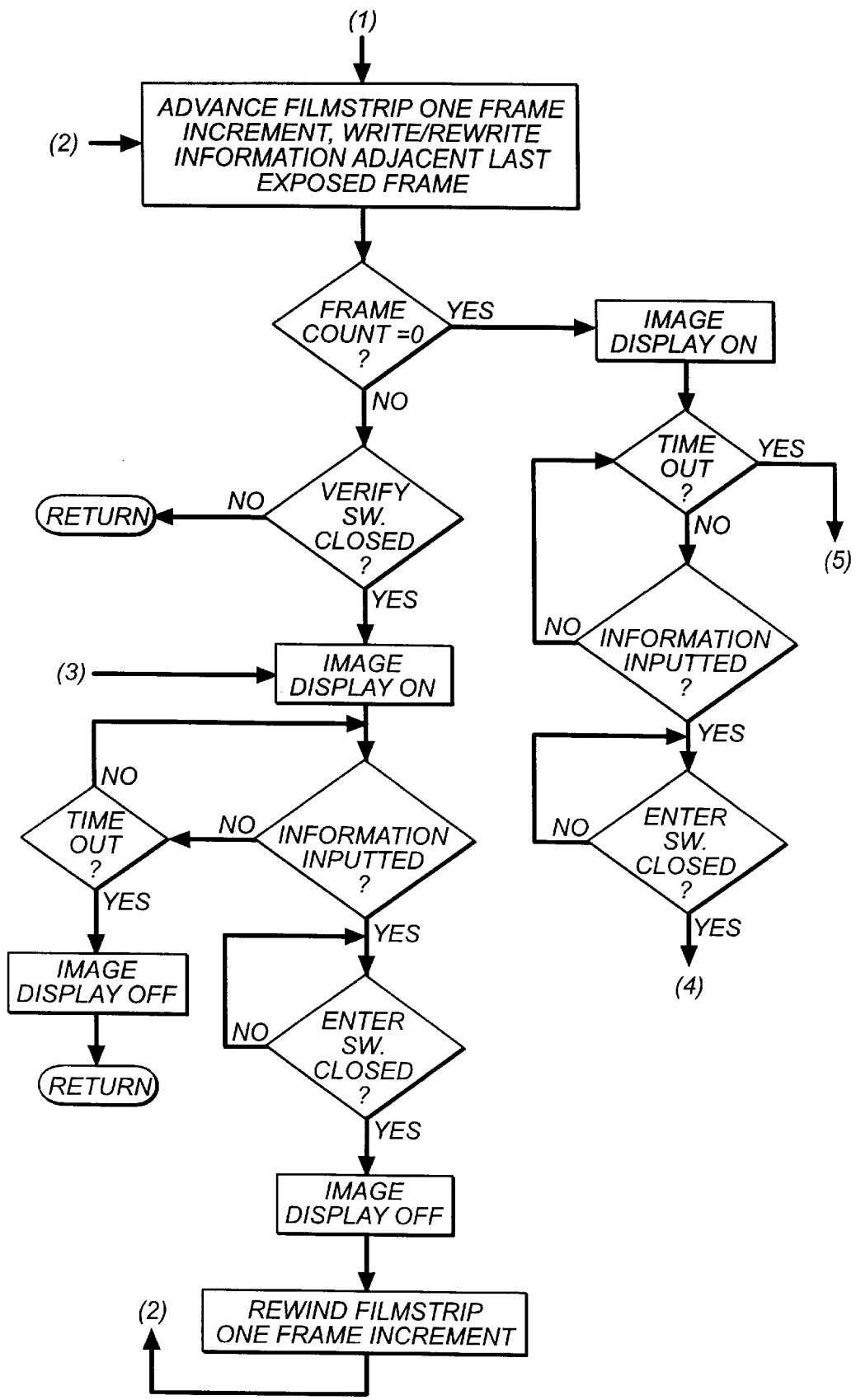
Figure 5:
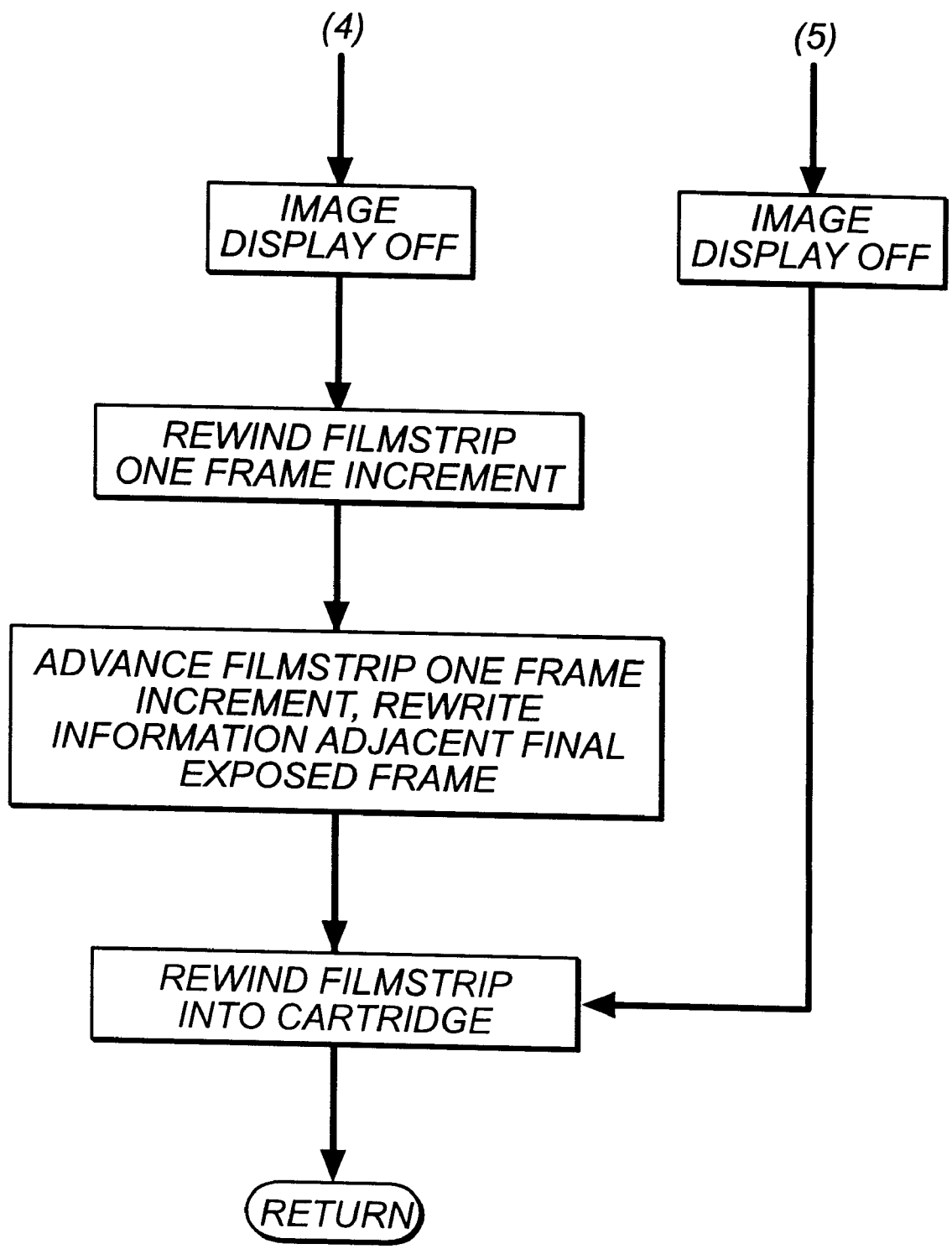

The operation of the camera 10 to illustrate the invention is shown in a flow chart in FIGS. 3–5.

Starting at FIG. 3, when the camera 10 is electrically powered "on" by flipping up the electronic flash unit 46, the status display 54 is simultaneously turned "on." The status display 54 shows, among other things, the frame count in the memory 60.

If then in FIG. 3 the cartridge present switch 50 remains open because no film cartridge 18 is present in the cartridge receiving chamber 26, the no-cartridge warning 52 is provided in the status display 54.

If conversely in FIG. 3 the cartridge present switch 50 is closed because the film cartridge 18 is present in the cartridge receiving chamber 26, the memory 60 is interrogated to determine whether the frame count is greater than "0".

If then in FIG. 3 the frame count in the memory 60 is "0", which indicates that the final one of the film frames 12 has been exposed, i.e. there are no film frames remaining for exposure, the number "0" appears in the status indicator 54.

If conversely in FIG. 3 the frame count in the memory 60 is greater than "0", for example "23",which indicates that there are twenty-three film frames 12 available for exposure, the number "23" appears in the status indicator 54.

If next in FIG. 3 the verify switch 114 is closed, the image display 62 is turned "on" in FIG. 4 to show the electronic image stored in the memory 60 corresponding to the latent image on the most-recently exposed one of the film frames 12 (which is "24"). Also, the status display 54 now shows the user selected information that is magnetically recorded along the track 16 adjacent the most-recently exposed one of the film frames 12, except that the visible indication of the selected "APS" print format "C", "H" or "P" is shown in the image display 62 superimposed on the electronic image.

If conversely in FIG. 3, the verify switch 114 remains open, and the release switch 68 is not closed within an allotted time, e.g. 150 seconds, determined by a timer 116 in the microcomputer 40, the camera 10 is powered "off" for battery consumption.

If conversely in FIG. 3, the verify switch 114 remains open, and the release switch 68 is closed within the allotted time, e.g. 150 seconds, because a picture is being taken, a latent image is exposed on the film frame 12 at the back-frame opening 30 and the electronic image sensor 58 is excited to form an electronic image which matches the latent image on the newly exposed frame.

Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. As the filmstrip 14 is advanced, the magnetic head 72 magnetically records (writes) the user-selected information along the track 16 adjacent the most-recently exposed frame 12. The frame count in the memory 60 is decremented by "1", for example to "22."

If next in FIG. 4 the frame count in the memory 60 is greater than "0", the verify switch 114 can be closed.

If then in FIG. 4 the verify switch 114 is not closed within the allotted time, e.g. 150 seconds, or alternatively the release switch 68 is not closed within the same time, the camera 10 is powered "off" for battery consumption.

If conversely in FIG. 4 the verify switch 114 is closed within the allotted time (as in FIG. 3), the image display 62 is turned "on" to show the electronic image stored in the memory 60 corresponding to the latent image on the most-recently exposed one of the film frames 12 (which is "23"). Also, the status display 54 now shows the user-selected information that is magnetically recorded along the track 16 adjacent the most-recently exposed one of the film frames 12, except that the visible indication of the selected "APS" print format "C", "H" or "P" is shown in the image display 62 superimposed on the electronic image.

If next in FIG. 4 none of the user-selected information switches 84, 86, 88 and 94 are closed within a brief time, e.g. 10 seconds, determined by the timer 116 in the microcomputer 40, the image display 62 is turned "off". The camera 10 including the status display 54 remain "on."

If conversely in FIG. 4 at least one of the user-selected information switches 84, 86, 88 and 94 is closed within the brief time, c.g. 10 seconds, determined by the timer 116 in the microcomputer 40, and the enter switch 98 is then closed, the image display 62 is turned "off", and the motor 38 is actuated to incrementally rotate the film spool inside the film cartridge 18 in order to advance the filmstrip 14 rearward (rewind) one frame increment to unwind the most-recently exposed one of the film frames 12 from the film take-up spool 34. Then in FIG. 4 the motor 38 is actuated to incrementally rotate the film take-up spool 34 in order to advance the filmstrip 14 forward one frame increment and wind the most-recently exposed one of the film frames 12 onto the exposed film roll 36 on the spool. As the filmstrip 14 is advanced, the magnetic head 72 magnetically records (rewrites) the newly selected information along the track 16 adjacent the most-recently exposed frame 12 in place of the existing information.

If alternatively in FIG. 4 the frame count in the memory 60 is "0", the image display 62 is turned "on" to show the electronic image stored in the memory 60 corresponding to the latent image on the final exposed one of the film frames 12 (which is "1"). Also, the status display 54 now shows the user-selected information that is magnetically recorded along the track 16 adjacent the final exposed one of the film frames 12, except that the visible indication of the selected "APS" print format "C", "H" or "P" is shown in the image display 62 superimposed on the electronic image. The image display 62 is turned "on" in this instance (as compared with the other instance in FIG. 4 that it is turned "on") without having to first close the verify switch 114.

If next in FIG. 4, none of the user-selected information switches 84, 86, 88 and 94 are closed within a brief time, e.g. 10 seconds, determined by the timer 116 in the microcomputer 40, the image display is turned "off" as indicated in FIG. 5, and the motor 38 is actuated to continuously rotate the film spool inside the film cartridge 18 to rewind the exposed film length into the cartridge. Then, the door 28 is pivoted open to remove the film cartridge 18.

If conversely in FIG. 4 at least one of the user-selected information switches 84, 86, 88 and 94 is closed within the brief time, e.g. 10 seconds, determined by the timer 116 in the microcomputer 40, the image display 62 remains "on." Then when the enter switch 98 is closed the image display 62 is turned "off" as indicated in FIG. 5, and the motor 38 is actuated to incrementally rotate the film spool inside the film cartridge 18 in order to advance the filmstrip 14 rearward (rewind) one frame increment to unwind the final exposed one of the film frames 12 from the film take-up spool 34.

Next in FIG. 5 the motor 38 is actuated to incrementally rotate the film take-up spool 34 in order to advance the filmstrip 14 forward one frame increment and wind the final exposed one of the film frames 12 onto the exposed film roll 36 on the spool. As the filmstrip 14 is advanced, the magnetic head 72 magnetically records (rewrites) the newly selected information along the track 16 adjacent the final exposed frame 12 in place of the existing information.

Next in FIG. 5 the motor 38 is actuated to continuously rotate the film spool inside the film cartridge 18 to rewind the exposed film length into the cartridge. Then, the door 28 is pivoted open to remove the film cartridge 18.

The invention has been described with reference to a preferred embodiment. However, it will be appreciated that variations and modifications can be effected by a person of ordinary skill in the art without departing from the scope of the invention. For example, when in FIG. 4 the enter switch 98 is not closed within an allotted time, e.g. 150 seconds, determined by the timer 116 in the microcomputer 40, and alternatively the release switch 68 is not closed within the same time, the camera 10 could be powered "off" for battery consumption.

PARTS LIST 10. camera
12. film frames
14. filmstrip
16. track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spool end
46. electronic flash unit
48. power switch
50. cartridge present switch
52. no-cartridge warning
54. status display
56. window
58. electronic image sensor
60. memory
62. image display
64. viewfinder
66. shutter release button
68. release switch
70. shutter
72. magnetic head
74. opening
76. film pressure platen
78. print quantity button
80. print title button
82. exposure correction button
84. print quantity switch
86. print title switch
88. exposure correction switch
90. format selection button
92. top plate
94. C, H, P switch
96. enter button
98. enter switch
100. film perforation sensor
102. film perforation sensor
104. film perforation
106. film perforation
108. pocket
110. pocket
112. verify button
114. verify switch
116. timer

What is claimed is:

1. A camera for exposing latent images on successive frames of a filmstrip having magnetic recording capacity, in which a memory stores a count indicative of the film frames remaining to be exposed including to indicate that the final frame was exposed, a magnetic head magnetically records user-selected information on the filmstrip adjacent each film frame, and a motor is actuated following exposure of each film frame to advance the filmstrip to permit said magnetic head to record the information on the filmstrip adjacent each exposed frame, is characterized in that:

an image display that can be manually turned on when a film frame is exposed;

a plurality of information selection switches can be manually used to select the information said magnetic head will magnetically record on the filmstrip adjacent the most-recently exposed one of the film frames including the final exposed frame; and an input receiving control is connected to said memory, said magnetic head, said motor, said image display, and said information selection switches to actuate said motor to advance the filmstrip to permit said magnetic head to record the information on the filmstrip adjacent the most-recently exposed one of the film frames except the final exposed frame, each time at least one of said selection switches is used to select the information, and to record the information on the filmstrip adjacent the final exposed frame, only one time at least one of said selection switches is used to select the information, and to turn on said image display automatically only when the final frame is exposed.

2. A camera as recited in claim 1, wherein an electronic image sensor is connected to said input receiving control to form an electronic image corresponding to the latent image on the most-recently exposed one of the film frames including the final exposed frame, said memory stores only the electronic image that corresponds to the latent image on the most-recently exposed one of the film frames and stores the magnetically recorded information for the same frame, and said image display displays the electronic image stored in said memory and displays at least some of the information stored in said memory superimposed on the electronic image.

3. A camera as recited in claim 2, wherein a verify switch is connected to said input receiving control to be manually used to turn on said image display for said image display to display the electronic image stored in said memory and to display at least some of the information stored in said memory superimposed on the electronic image before said information selection switches can be manually used to select the information to be magnetically written on the filmstrip adjacent the most-recently exposed one of the film frames.

4. A camera as recited in claim 3, wherein said input receiving control turns on said image display automatically without having to use said verify switch when the count stored in said memory indicates the final frame was exposed.

5. A camera as recited in claim 1, wherein said input receiving control first actuates said motor to advance the filmstrip rearward one frame increment each time at least one of said information selection switches is manually used to select the information to be magnetically written on the filmstrip adjacent the most-recently exposed one of the film frames including the final exposed frame, and then actuates said motor to advance the filmstrip forward one frame increment for said magnetic head to magnetically record the information adjacent the same frame which is selected.

6. An information rewrite method in a camera for exposing latent images on successive frames of a filmstrip having magnetic recording capacity, in which a memory stores a count indicative of the film frames remaining to be exposed including to indicate that the final frame was exposed, a magnetic head magnetically records user-selected information on the filmstrip adjacent each film frame, and a motor is actuated following exposure of each film frame to advance the filmstrip to permit the magnetic head to record the information on the filmstrip adjacent each exposed frame, is characterized by the steps:

using at least one of a plurality of information selection switches to select the information the magnetic head will magnetically record on the filmstrip adjacent the most-recently exposed one of the film frames including the final exposed frame;

actuating the motor to advance the filmstrip to permit the magnetic head to record the information on the filmstrip adjacent the most-recently exposed one of the film frames except the final exposed frame, each time at least one of the selection switches is used to select the information;

actuating the motor to advance the filmstrip to permit the magnetic head to record the information on the filmstrip adjacent the final exposed frame, only one time at least one of the selection switches is used to select the information; and permitting an image display to be manually turned on each time one of the film frames, except the final frame, is exposed and turning on the image display automatically only when the final frame is exposed.

7. Information rewrite apparatus in a camera for exposing latent images on successive frames of a filmstrip having magnetic recording capacity, and in which a memory stores a count indicative of the film frames remaining to be exposed including to indicate that the final frame was exposed, a magnetic head magnetically records user-selected information on the filmstrip adjacent each film frame, and a motor is actuated following exposure of each film frame to advance the filmstrip to permit the magnetic head to record the information on the filmstrip adjacent each exposed frame, is characterized by:

a plurality of information selection switches to select the information the magnetic head will magnetically record on the filmstrip adjacent the most-recently exposed one of the film frames including the final exposed frame;

means for actuating the motor to advance the filmstrip to permit the magnetic head to record the information on the filmstrip adjacent the most-recently exposed one of the film frames except the final exposed frame, each time at least one of the selection switches is used to select the information; and for actuating the motor to advance the filmstrip to permit the magnetic head to record the information on the filmstrip adjacent the final exposed frame, only one time at least one of the selection switches is used to select the information; and an image display, and means permitting the image display to be manually turned on each time one of the film frames, except the final frame, is exposed and turning on the image display automatically only when the final frame is exposed.

* * * * *